L. R. BOYD, Dec'd.

Consolidated FRUIT JAR COMPANY, assignee.

MEANS FOR PREVENTING CORROSION OF METALLIC CAPS.

No. 9,909. Reissued Oct. 25, 1881.

Attest:
Geo. T. Smallwood Jr.
L. McCopstins.

Inventor:
Lewis R. Boyd.
BY Knight Bros
Attys

UNITED STATES PATENT OFFICE.

CONSOLIDATED FRUIT JAR COMPANY, OF NEW YORK, N. Y., ASSIGNEE OF LEWIS R. BOYD, DECEASED.

MEANS FOR PREVENTING CORROSION OF METALLIC CAPS.

SPECIFICATION forming part of Reissued Letters Patent No. 9,909, dated October 25, 1881.

Original No. 88,439, dated March 30, 1869. Application for reissue filed July 16, 1881.

*To all whom it may concern:*

Be it known that LEWIS R. BOYD, formerly of the city, county, and State of New York, but now deceased, was the inventor of a new and useful Improvement in Means for Preventing Corrosion of Metallic Caps or Covers, especially such as are designed for fruit-jars, and that Letters Patent for said improvement were granted to him on the 30th of March, 1869, which, by assignment, have become wholly vested in the undersigned, the CONSOLIDATED FRUIT JAR COMPANY; and I do hereby declare that the following is a full, clear, and exact description of the said invention, reference being had to the drawings which accompany and form part of this specification.

Figure 1:
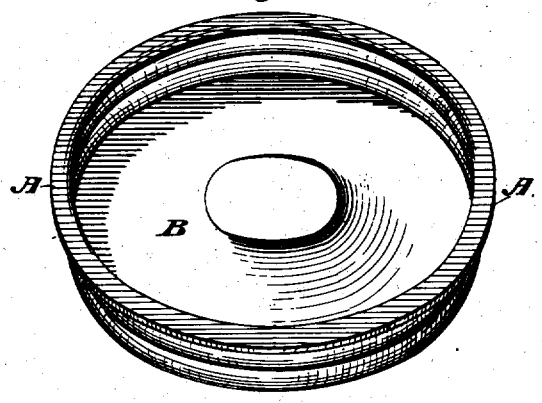
Figure 2:
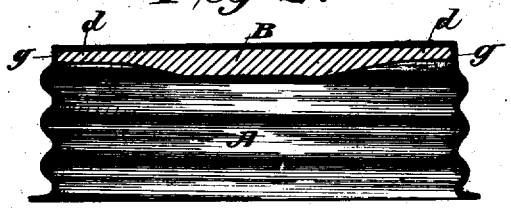

Of the drawings, Figure 1 is a perspective of a metallic screw-cap, such as is suitable for a fruit-jar, it being shown inverted, so as to represent the inside of it and illustrate the mode of application to it of the glass partial lining or plate, hereinafter referred to. Fig. 2 is a vertical section through the center of the same cap.

Similar letters in the figures denote similar parts.

Before this invention caps or covers for the purpose mentioned and for analogous uses were generally made either wholly of glass or wholly of metal, or of metal lined on its inside surface with a thin rigid glaze or enamel. Caps made wholly of glass were expensive, and were not adapted to fit closely enough upon the jar or other vessel to render it thoroughly air-tight. Those having a glaze or enamel were difficult to make perfect. The enamel was liable to have in it minute air-holes, through which the acids of the contents of the jar or vessel could penetrate, and it was so thin, and at the same time so rigid, that it was incapable of resisting the strain caused by atmospheric pressure upon the head of the cap when in use. For these and other reasons such classes of caps had, prior to this invention, been almost completely superseded by metallic caps. The latter, although they are sufficiently cheap, and can easily be made to close a jar or other vessel air-tight, are found to be objectionable, because, after a filled jar closed with one of them has stood for a little time, its contents are often observed to be affected by the metallic material of the cap, so that a perceptible taste is imparted to them.

The object of this improvement is to remedy this defect in metallic caps of the kind referred to; and it consists in combining with a screw-cap, which has in it corrugated screw-threads, and is formed of thin, soft metal, in the usual or in any suitable manner, and in permanently securing to the inside of the head of the same a glass lining-plate, so arranged that the glass shall be the only portion of the cap which at any time comes in contact with the contents of the jar. By this means all the advantages of the cheap metallic cap are retained, and the danger of a disagreeable flavor being imparted to the articles contained in the jar is entirely obviated, while the slight additional cost of the glass plate has been found not to retard the introduction of the invention into use.

To enable others to employ this improvement, the mode of putting it in practice will now be described.

A, Fig. 1, is an example of a screw-cap suitable for a fruit or preserving jar. It is made of thin, soft metal, so as to be capable of adapting itself to the irregularities which are found in ordinary glass fruit-jars, and is provided with corrugated screw-threads, and should preferably be manufactured of the same material and in the same shape and manner as the well-known cap used with the so-called "Mason" jar. Into the top of this cap the plate B, made of glass of any desired thickness and of any preferred cross-section at *d d*, and serving as a lining for the under side of the head of the cap, is closely fitted a slight shoulder to secure it firmly in place, as seen at *g g*, Fig. 2, being preferably spun in the cap near its flat end, or it may be retained in position in any other convenient way; but it should be so secured as to form a permanent part of the cap.

If desired, other material than glass may be employed for the plate B. It may be made of any suitable vitreous, earthen, or other substance which is adapted to be secured as a separate piece to the cap, and which will not cause the injurious flavor referred to. But glass is preferable, because it is convenient, and because it renders the articles more acceptable to the public.

It will be seen that by this mode of combining the glass or equivalent plate with the cap, no portion of the contents of the jar can, under any circumstances, come in contact with any metallic part of the cap, and consequently no deleterious taste can be caused. At the same time the application of the glass plate imparts a somewhat ornamental appearance to the cap.

Having thus described the invention, which was made by the said LEWIS R. BOYD, what is claimed therein is—

The new article of manufacture, consisting of a screw-cap for fruit-jars and analogous uses made of thin, soft metal with corrugated screw-threads in it, and having combined with it a separate plate or partial lining of glass, or its equivalent, permanently secured therein, substantially in the manner and for the purpose set forth.

CONSOLIDATED FRUIT JAR CO.,
By R. W. BOOTH,
*President.*

Witnesses:
W. I. JAQUES,
JACOB SMITH, Jr.